United States Patent Office 2,914,251
Patented Nov. 24, 1959

2,914,251

THERMOSTATIC STEAM TRAP

David L. Morgan, Shelton, Conn., assignor to Robertshaw-Fulton Controls Company, Richmond, Va., a corporation of Delaware Application May 28, 1958, Serial No. 738,409

2 Claims. (Cl. 236—56)

This invention relates to steam traps or condensation draining devices and more particularly to thermostatic control devices of this character.

An object of this invention is to control the varying conditions of a fluid medium in a steam trap.

Another object of this invention is to control the pressure drop of a fluid medium in the chamber of a steam trap.

Another object of this invention is to store condensate within a portion of a steam trap.

Another object of this invention is to protect an expansible and contractible element in a steam trap from an excessive pressure condition.

It is another object of this invention to limit the pressure difference between the volatile fluid in an expansible and contractible element and the fluid medium in the chamber of a steam trap.

This invention has a further object in that condensate is retained within a portion of a steam trap and subsequently utilized to limit the pressure of a fluid medium within the steam trap chamber.

In carrying out this invention, a steam trap casing is provided with an inlet and an outlet and a chamber therebetween. An inlet valve and an outlet valve are operably disposed in the chamber for controlling the flow of a fluid medium therethrough in accordance with the varying conditions of such fluid medium. Condition responsive means in the form of a bellows is operably connected to the outlet valve for actuating the same according to such varying conditions. The bottom of the casing is formed with a cavity for storing a portion of the fluid medium during the normal operation of the steam trap so that stored portion may be subsequently utilized to control the condition variations of the fluid medium in the chamber during an abnormal operation.

Other objects and advantages of this invention will become apparent from the following description taken in connection with the accompanying drawings wherein.

Figure 1:
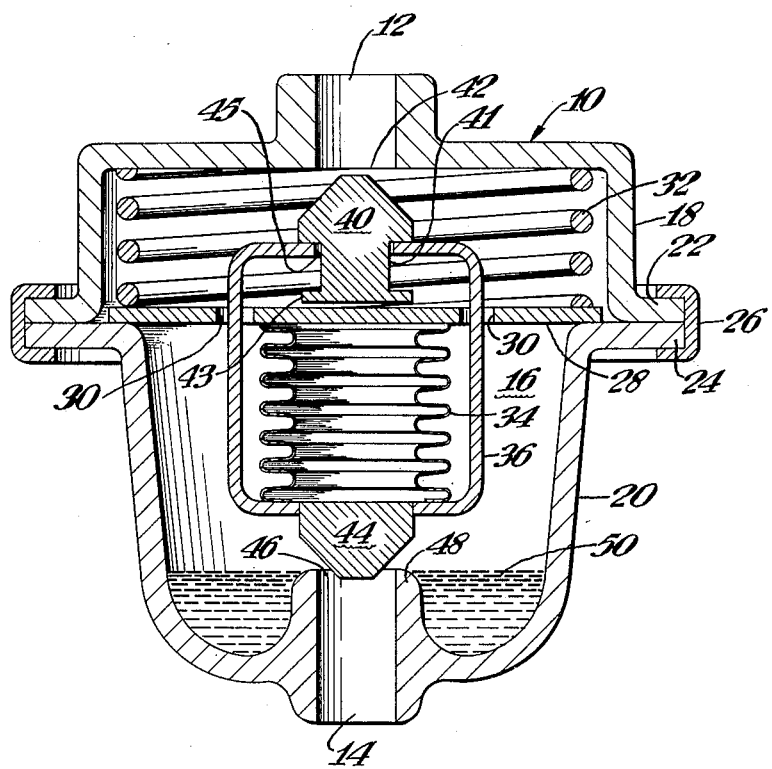
Fig. 1 is a longitudinal section of a steam trap embodying this invention.

Referring to Fig. 1, the steam trap includes a casing 10 having an inlet 12, an outlet 14, and a communicating chamber 16 therebetween. To facilitate assembly, the casing 10 is formed in two parts 18 and 20 having mating flanges 22 and 24 which are secured together by a suitable annular clamp 26. A mounting plate 28 is provided with two spaced slots 30, 30 and is supported at its periphery on the internal end portion of the flange 24. Yieldable means in the form of a coil spring 32 is mounted in compression between the plate 28 and the upper internal wall of casing 10 to bias the plate 28 against its support on flange 24.

The temperature responsive means takes the form of an expansible and contractible bellows member 34 containing a volatile fluid and having one sealed end fixed to mounting plate 28 and an opposite sealed end freely movable toward the outlet 14. The free end of bellows 34 carries a strap member 36 of generally rectangular configuration defining two oppositely disposed end strips and parallel side strips. The side strips of the strap 36 slidably extend through the two spaced slots 30, 30 in the mounting plate 28 in order to guide and permit relative reciprocable movement between the strap 36 and the mounting plate 28.

A pair of conical plug type valve members 40, 44 are respectively carried by the opposite end strips of the strap 36. The upper valve member 40 is provided with a necked down stem 41 and an enlarged head 43. The valve stem 41 is slidably mounted in an aperture 45 centrally disposed in the upper end strip of the strap 36 and the enlarged head 43 retains the valve member 40 in assembled relation with the strap 36. The valve member 40 is engageable with a valve seat 42 defined by the annular shoulder on the inner end wall of the inlet 12. The lower valve member 44 is fixed to the lower end strip of strap 36 and is engageable with a valve seat 46 defined by the annular shoulder on the inner end wall of an extension of the outlet 14.

The outlet valve seat 46 is spaced from the bottom wall of casing 10 by means of a centrally bored boss 48 which is integrally formed with such bottom wall so as to extend into the chamber 16. The exterior surface of the boss 48 has an increasing taper so that its annular cylindrical wall slopes outwardly toward the bottom wall of the casing 10. As is illustrated in Fig. 1, the lower part 20 of casing 10 has a generally frusto-conical configuration and its internal cylindrical tapering wall cooperates with the sloping wall of the boss 48 to define an annular storage cavity 50 therebetween. The storage cavity 50 receives condensate from the chamber 16 and such condensate spills over the valve seat 46 when the storage cavity 50 is filled.

During operation of the device shown in Fig. 1, the steam trap functions to control the flow of condensate from a steam apparatus or steam piping system. When the flow of a fluid medium into the chamber 16 from the inlet 12 comes in contact with the bellows 34, the temperature of the fluid medium affects the volatile fluid within the bellows 34. When the fluid medium is in the form of steam, the volatile fluid changes from a liquid to a vaporous state and generates pressure within the bellows 34 to expand the same. Expansion of the bellows 34 causes the strap 36 to move downwardly until the valve member 44 engages the outlet seat 46 and prevents the escape of the fluid medium. At this time, the outlet 14 is closed while full flow is permitted through the open inlet 12. Should the pressure within the chamber 16 continue to build up after the outlet 14 is closed, the bellows 34 will continue to expand and move the mounting plate 28 upwardly against the bias of the coil spring 32. Since the stem of the check valve 40 is slidably mounted on the strap member 36, the mounting plate 28 engages the enlarged head 43 of the check valve 40 to move the same towards its seat 42 and restrict any flow between the chamber 16 and the inlet 12.

As long as the fluid medium contacting the walls of the bellows 34 remains in the form of steam, the outlet 14 will remain closed. However, should even a small amount of condensate collect around the bellows member 34, there will be an instantaneous flow of heat from the vapor within the bellows 34 to the condensate on the outside thereof. This flow of heat causes the vapor of the volatile fluid to condense, thereby causing contraction of the bellows 34. Contraction of the bellows 34 opens the outlet 14 and permits the water and air extracted from the steam to escape; however, it should be noted that the condensate water does not escape through the outlet 14 until the condensate cavity 50 is sufficiently filled so as to spill over the seat 46. As soon as the overflow condensate is exhausted, the bellows 34 responds as described above whereby the continued cycling of the steam trap performs the desired function of retaining steam in an apparatus or piping system until it has given up its latent heat and then to exhaust air and condensate when it accumulates.

If the supply to the apparatus or piping system is closed, there can be a reduction of pressure in the chamber 16 if a valve (not shown) contained in the apparatus or piping system is opened. The pressure on the outside of bellows 34 will be reduced at a faster rate than the pressure inside due to normal cooling and the present invention limits the difference of such pressures to an operating limit. Should this pressure difference become great enough, the bellows 34 would "set" either longer or shorter than normal so that the steam trap would be damaged and fail to operate properly.

Assuming that the supply is closed and an apparatus valve is opened while the inlet 12 is open, at an operating temperature above 212° F., the condensate previously accumulated in the cavity 50 will boil upon contact with the inflowing steam and the resulting vapor will try to escape through the inlet 12 and the outlet 14. However, since the external pressure on the bellows 34 has been reduced to a value lower than the internal pressure, the bellows 34 will expand further and compress the spring 32 until the check valve 40 engages seat 42. Thus, check valve 40 will retard the escape of vapor through inlet 12 and valve 44 will retard the escape of vapor through outlet 14. This prevents any further pressure drop in the chamber 16 until the bellows 34 has cooled sufficiently; accordingly, the pressure difference between the inside and the outside of the bellows is prevented from becoming great enough to damage the bellows.

It is possible that some of the condensate will remain in the storage cavity 50 when the steam trap is not in operation. However, the tapered construction of the cavity 50 formed by the sloping walls of the boss 48 and the lower part 20 of casing 10 will not hinder free expansion of such condensate if freezing occurs; thus, the trap is so constructed as to prevent damage due to freezing.

Figure 2:
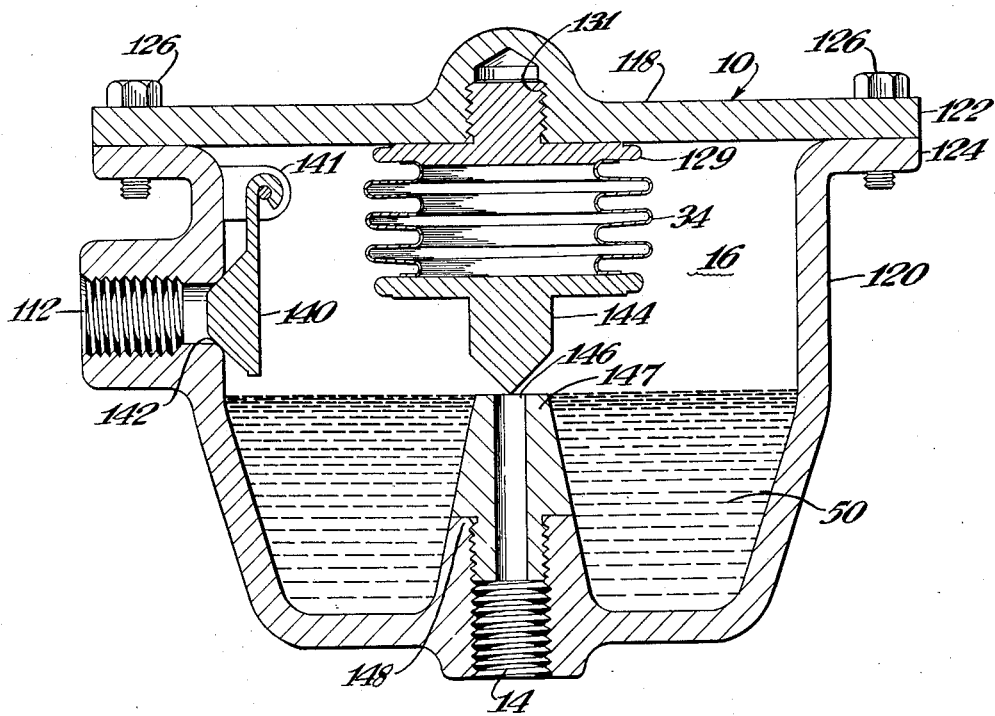
Fig. 2 is a longitudinal section of a steam trap embodying a modification of this invention.

In the modification of the invention illustrated in Fig. 2, the same reference numerals have been used for identical parts previously described, and reference numerals with 100 added have been used to indicate similar parts. The steam trap includes a casing 10 having an inlet 112, an outlet 14, and a communicating chamber 16 therebetween. The casing 10 is formed in two parts 118 and 120 having mating flanges 122 and 124 which are secured together by suitable bolts 126. The expansible and contractible bellows member 34 has a free end carrying a conical plug type valve 144 and has an opposite end fixed to a mounting plate 129 which has an upper projection 131 that is threaded centrally of the cover 118.

A conical plug type check valve 140 is pivotally mounted between a pair of ears 141 (only one being shown) extending inwardly from an internal wall of the lower part 120 of the casing 10. The check valve 140 is engageable with a valve seat 142 defined by the annular shoulder on the inner end wall of the inlet 112 which is formed in the lower part 120 of the casing 10. The outlet valve member 144 is fixed to the lower end of the bellows 34 for movement thereby. The outlet valve member 144 is engageable with a valve seat 146 defined by the annular shoulder on the inner end wall of a centrally bored adaptor plug 147. The boss 148 extends inwardly from the bottom wall of the casing 10 and is provided with a threaded bore which provides mounting means for the adaptor plug 147. The exterior of the adaptor plug 147 and the boss 148 have a mating conical configuration which cooperates with the internal sloping walls of the lower part 120 of casing 10 to define an annular storage cavity 50 therebetween.

The operation of the modification shown in Fig. 2 is similar to that previously described for the device of Fig. 1, except that the check valve 140 is not operated by the bellows member 34. When the pressure of the medium inside the chamber 16 becomes greater than the pressure of the medium in inlet 112, the check valve 140 will be moved toward its valve seat 142 and thus functions in the same manner as the previously described check valve 40 in retarding the escape of vapors through the inlet 112 while the outlet valve 144 is operative to retard the escape of vapor through the outlet 14.

Inasmuch as various changes can be made in the above-described invention, it is intended that the foregoing description and the drawings shall be interpreted as illustrative and not in a limiting sense.

I claim:

1. In a steam trap, the combination comprising a casing having inlet and outlet passages communicating with a chamber therebetween, a mounting plate operably disposed in said chamber, a movable strap member guided by said plate and having a pair of end strips respectively disposed adjacent said inlet and outlet passages, an outlet valve member carried on one end strip and cooperating with said outlet passage, an inlet valve member slidably mounted on the other end strip and being engageable with said mounting plate for movement toward said inlet passage, an expansible and contractible element operatively connected between said mounting plate and said end strip adjacent said outlet passage, said expansible and contractible element containing a volatile fluid whereby a temperature increase of a fluid medium in said chamber causes expansion of said element for moving said outlet valve member toward said outlet passage and a pressure increase of the fluid medium causes additional expansion of said element for operating said mounting plate to move said inlet valve member toward said inlet passage, and a cavity formed in said casing and communicating with said chamber to store condensate from the fluid medium flowing through said chamber whereby the stored condensate is effective to limit the pressure of the fluid medium in said chamber.

2. In a steam trap, the combination comprising a casing having upper and lower portions forming a chamber for receiving a fluid medium, the lower portion having a frusto-conical configuration formed by a bottom wall and a tapering cylindrical side wall, an inlet passage in the uppper portion having an inlet valve seat for admitting the fluid medium into said chamber, an outlet passage extending through the bottom wall of said lower portion, an outlet valve seat for said outlet passage and being spaced inwardly from the bottom wall of said lower portion to form a cavity therein for storing condensate from the fluid medium, an annular support formed on the upper end of the side wall, a slotted mounting plate movably disposed on the upper portion of said casing, yieldable means disposed in the upper portion of said casing and engaging said mounting plate to bias the same against said annular support, a movable strap member having a pair of side strips extending through said slotted mounting plate and a pair of end strips respectively disposed adjacent said inlet and outlet valve seats, a bellows member having one end fixed to said mounting plate and an opposite end fixed to said end strip adjacent said outlet valve seat, said bellows member containing a volatile fluid whereby a temperature increase of the fluid medium in said chamber causes expansion of said bellows member, an outlet valve member fixed to said end strip adjacent said outlet valve seat and engaging the same upon initial expansion of said bellows member, an inlet valve member being engageable by said mounting plate and being slidably mounted on the other end strip for movement relative to said strap member, said inlet valve member being movable toward said inlet valve seat by said plate member being moved against the bias of said yieldable means by additional expansion of said bellows member whereby said inlet and outlet passages may be closed at the same time.

References Cited in the file of this patent

UNITED STATES PATENTS

| | | |
|---|---|---|
| 1,458,813 | Ferris | June 12, 1923 |
| 1,646,686 | Crosby | Oct. 25, 1927 |
| 1,884,857 | Randall | Oct. 25, 1932 |
| 2,778,573 | Morgan | Jan. 22, 1957 |

FOREIGN PATENTS

| | | |
|---|---|---|
| 332,642 | Germany | Feb. 4, 1921 |